Jan. 23, 1934.  J. S. MYERS  1,944,260
WINDSHIELD CLEANER
Filed Aug. 23, 1930   2 Sheets-Sheet 1
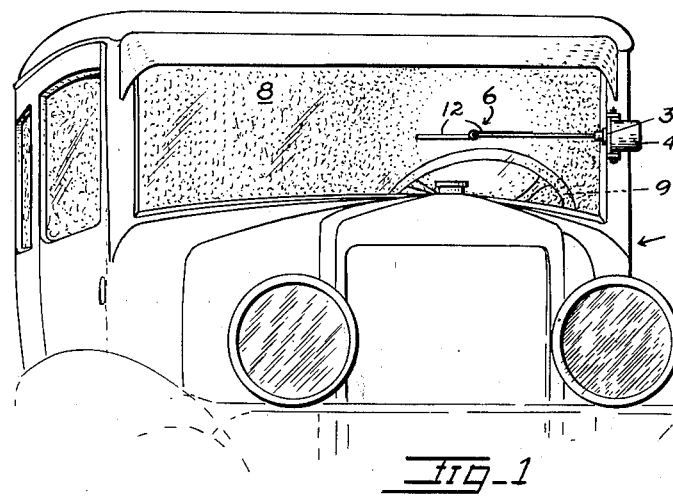
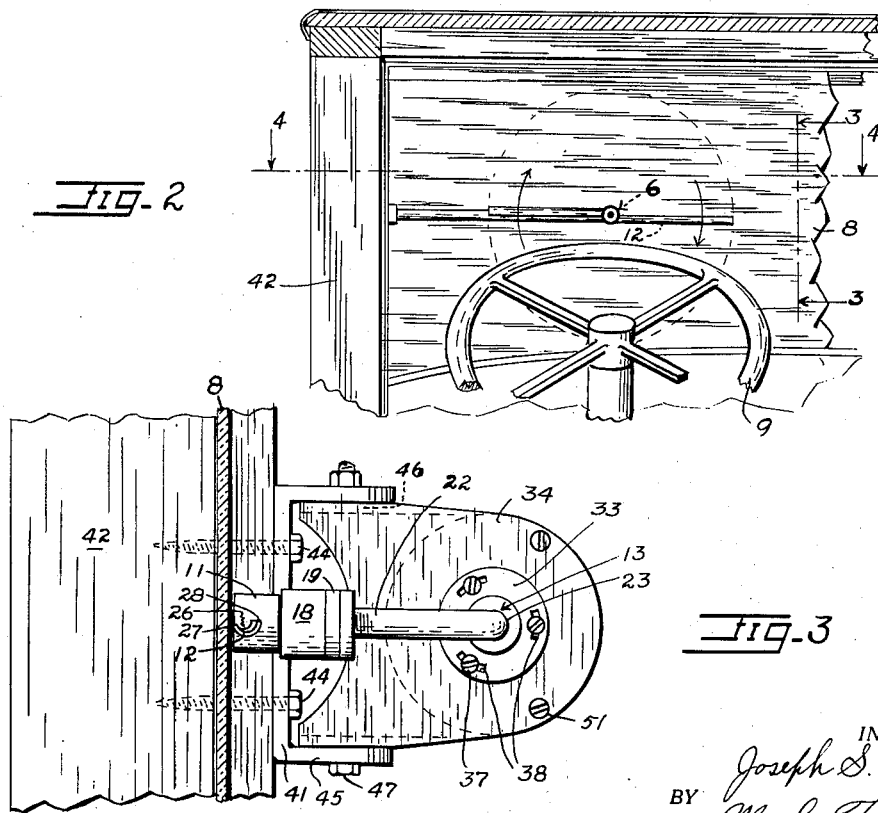
INVENTOR.
Joseph S. Myers
BY M. C. Frank
ATTORNEY Jan. 23, 1934. J. S. MYERS 1,944,260
WINDSHIELD CLEANER
Filed Aug. 23, 1930 2 Sheets-Sheet 2
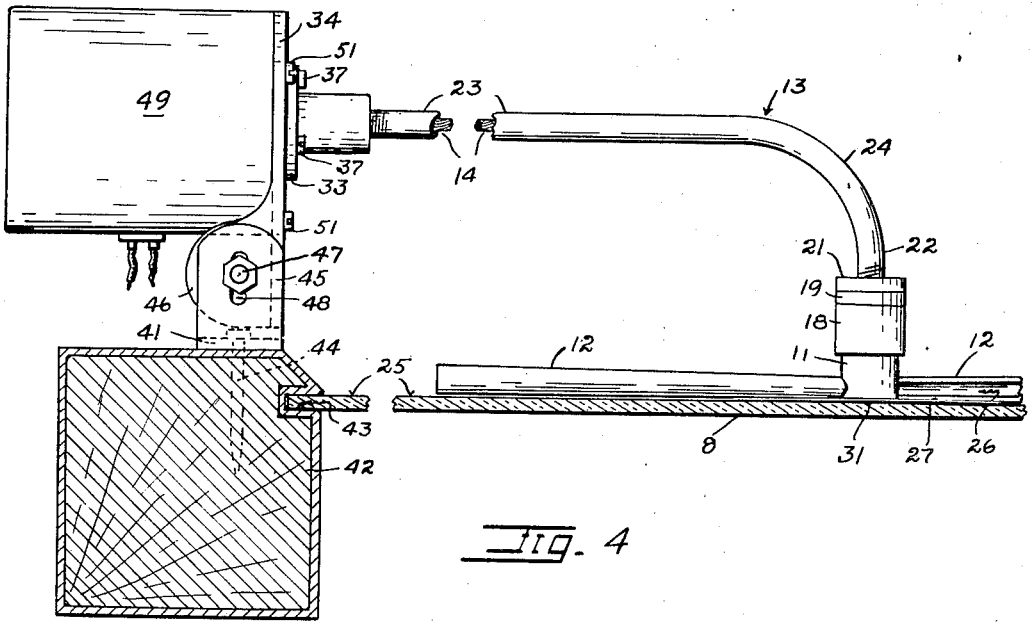
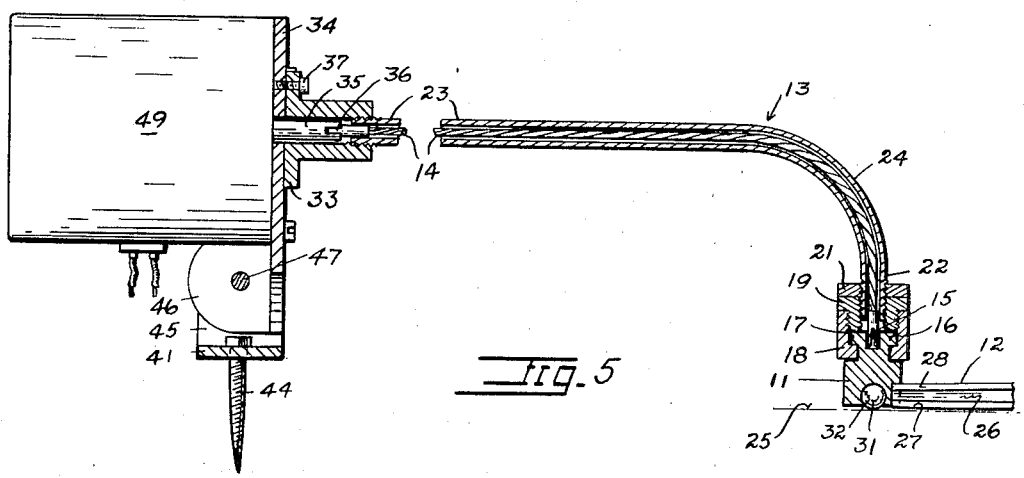
INVENTOR.
Joseph S. Myers
BY M. C. Frank
ATTORNEY.

Patented Jan. 23, 1934

1,944,260

UNITED STATES PATENT OFFICE 1,944,260

WINDSHIELD CLEANER

Joseph S. Myers, Oakland, Calif.

Application August 23, 1930. Serial No. 477,210

9 Claims. (Cl. 20—40.5)

The invention relates to a rotary cleaner for cleaning the exposed surfaces of transparent windshield panes and the like.

An object of the invention is to provide an improved cleaner of the class described which is arranged for continuous operation to clean a surface as objectionable matter is deposited thereon and in such manner that said matter is engaged but once by the wiper.

Another object is to provide a device which is arranged to remove objectionable matter from a pane surface in such a manner that said matter is not wiped along and over the pane surface during its removal therefrom.

A further object is to provide a device of the class described in which the wiping element does not engage the surface to be cleaned, thereby preventing frictional wear of said element and minimizing the driving power required therefor.

Yet another object is to provide a generally improved cleaning blade for devices of the class described and wherein collected matter is entirely centrifugally discharged therefrom.

A still further object is to provide a particularly simple means for driving the cleaning blade, which means is arranged for mounting on an element which is fixedly related to the plane of the pane to be kept clean.

The invention possesses other objects and features of advantage, some of which, with the foregoing, will be set forth or be apparent in the following description of a preferred form of the invention which is illustrated in the accompanying drawings, in which:

Figure 1 is a fragmentary front perspective of an automobile having a cleaner embodying the present invention mounted thereon in operative relation to the automobile windshield.

Figure 2 is a fragmentary and enlarged view of the cleaner installation as seen from within the automobile body and from a driver's position.

Figure 3 is an enlarged view of the cleaner installation taken as at 3—3 in Figure 2.

Figure 4 is an enlarged plan view of the cleaner and its mounting means, the view being taken at 4—4 in Figure 2.

Figure 5 is a plan section through the cleaner structure shown in Figure 4.

As particularly illustrated, a cleaner 6 embodying my invention is mounted on an automobile 7 for keeping a portion of a windshield 8 in front of the vehicle steering wheel 9 clear of rain or fog or other objectionable deposits. Essentially, the cleaner comprises a rotating head 11 carrying one or more radial cleaner blades 12 and swivelled to the end of a supporting bracket arm 13. Preferably, and as shown, in Figure 5, the arm 13 is tubular and carries therein a flexible drive shaft or cable 14 connected with the head 11 through a suitable pin-and-slot coupling 15. As particularly shown, the inner head end is provided with an annular and radial flange 16 for engagement in a raceway 17 defined between threadedly engaged annular members 18 and 19, the latter member threadedly receiving an end of the arm 13 and being releasably locked in its set position by means of a lock-nut 21 also mounted on said arm end.

The bracket arm 13 is generally L-shaped in outline, with perpendicularly related portions 22 and 23 connected by a curved portion 24 whereby to avoid sharp turns in the arm bore which receives the drive shaft 14. The axis of the arm portion 22, it is noted, is arranged to be disposed in exactly perpendicular relation to the windshield surface 25 to be cleaned whereby a cleaner blade 12 will rotate in a plane parallel to said surface and will be similarly operative thereagainst in all parts of its path of movement. Preferably, the head and cleaner blade assembly are balanced about their axis of rotation; in the present instance, a pair of like and oppositely directed blades 12 is provided on the head 11, said head being cylindrically symmetrical about its axis of rotation.

Referring now to the specific form of a blade 12, said blade is seen to provide a longitudinal groove 26 in its forward face, said groove continuing for the full length of the blade. The longitudinal blade edges 27 and 28 define a plane which is generally perpendicular to the surface 25, the edge 27 comprising the working edge of the blade and preferably being chamfered, as is particularly shown in Figure 3. When the blade is moved in its operative plane opposite the windshield surface 25, the edge 27 is arranged to remove any water, or other deposits, from said surface, and to deposit the collected matter in the groove 26 where it is held by reason of the blade motion for a solely centrifugal movement and escape longitudinally of the groove. Since matter collected at the inner blade portions must move through the outer groove portions, the groove is desirably tapered to a greater section at its outer end whereby its capacity increases to accommodate the increasing fluid flow along the blade. The blade 12 is thus seen to function both as a collecting and centrifuging arm with respect to the deposits on the portion of the windshield surface over which it operates.

The specific form of the blade 12 is seen to possess a number of operative advantages which are not found in blades of other shape. Since the front face of the blade as defined by the plane of the edges 27 and 28 is, as has been noted, substantially perpendicular to the windshield surface 25, no axial thrust is created on the blade or head by reason of the operative rotation of the head and blade assembly against the air. Furthermore, the rotation of the blade creates a moving front of air ahead of it which tends to loosen and "pile up" the matter to be collected by the blade. The matter collected in the blade grooves is carried therethrough in an air stream whereby frictional effects are minimized and the blade grooves are constantly scoured. As particularly shown, the blades are formed as trough-shaped strips of sheet material, whereby they may be of minimum weight and are at the same time stiffened against lateral bending.

Preferably, and as shown, the working blade edge 27 does not actually engage the surface 25, but is arranged to move in a plane so close to said surface as to effect the necessary removal of moisture and other foreign matter. In this manner, the blade is not worn against the surface 25, nor is wearing friction created to oppose its motion. Should the blade edge actually engage the surface 25, other disadvantages of contact wipers or cleaners are created, namely, a wiped distribution of the matter to be removed over the surface 25 and along the working blade edge, and a scratching of the surface by any grit in said material. It is therefore preferred to mount the present cleaner blades for operation as described and shown.

Means are preferably provided for insuring the aforesaid spaced and operation relation of the blade to the surface 25, and as shown, such means comprises the interposition of a ball bearing 31 between the outer end of the head 11 and the surface 25. The ball 31 is shown (Fig. 5) mounted in a socket 32 provided in the end of the head 11 for retention and rotation therein. In this manner, an anti-friction bearing is provided for operation between the head and windshield whereby, when the ball engages the surface 25, the proper spacing of the cleaner blades therefrom is insured and the cleaning unit is steadied in its mounting.

Referring now to the mounting means for the cleaner structure, the supported end of the supporting arm portion 23 is provided with a radial flange 33 (Figs. 3, 4 and 5) for mounting on a plate member 34, said member being perforated in the line of the bore of said arm portion for the extension therethrough of an operating shaft 35 for connection to the flexible shaft 14 as by a tongue-and-slot coupling indicated at 36. The arm portion 23, it is noted, is arranged for disposal in a generally parallel relation to the surface 25 and is preferably mounted on the member 34 for a certain degree of adjustment about its axis whereby to facilitate a proper angular setting of the head 11 with respect to said surface. As shown, screws 37 engage the member 34 and through arcuate slots 38 in the flange 33 whereby the arm portion 23 may be fixed to the member 34 in adjusted relation thereto.

A base plate 41 is provided for mounting on a frame member 42 for the windshield pane, said frame member in the present instance comprising a side post of the automobile top structure and providing a slideway 43 (Fig. 4) in which the pane is adjustably disposable. As shown, the plate 41 is fixed on the post 42 by means of lag screws 44 and is provided with a pair of transverse ears 45 to and between which transverse ears 46 provided on the member 34 are arranged to be fixedly secured by means of a clamp bolt 47 engaged through the different said ears. The ears 46 are integral with the member 34, and the mounting provided permits an adjusted positioning of the member 34 about the axis of the bolt 47, said axis being parallel to the plane of the pane. As is indicated in Figure 4, the bolt-receiving perforations in the ears 45 are slots 48 whereby to provide for bodily adjustment of the cleaning device to and from the pane, as may be required in mounting the device in its operative position. It is noted that the adjustments provided by the sectional bracket structure are those which are required for installing the device in place, and that other adjustable bracket structures might be employed without departing from the spirit of the present invention.

The shaft 35, it will now be noted, may be either hand or power operated. As particularly indicated, the shaft 35 is that of a motor 49 which is mounted on the plate member 34 by means of screws 51. In practice, the motor 49 might be air or electrically driven; in the present instance it is assumed to be an electric motor for operation from the automobile storage battery.

The complete assembly now described is seen to be a unit which is mounted in place entirely by fixing the bracket base 41 to an appropriate part of the windshield frame. No perforating of the windshield pane is required for the installation of the device, and the cleaner head 11 is arranged to be operated at such a speed that the blades 12 are invisible to a person looking through a cleared windshield area. It is noted that the said cleared area will be larger than the circular area over which the blades 12 operate, for the air-borne and centrifugally discharged collected material will not strike the pane surface 25 adjacent said area, and the moving air along the stream thereof will tend to clean said surface about said area whereby the cleaned zone will extend and taper off into the uncleaned area, this condition being indicated somewhat in the showing of Figure 1.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative, and that such changes may be made, when desired, as fall within the scope of the appended claims.

Having thus described my invention, I claim as new and desire to secure by Letters Patent of the United States the following:

1. In a device for removing deposited material from a plane surface, a rotatable head, and a cleaning blade carried for rotation with said head and in a plane parallel to said surface, the forward face of said blade being provided with a longitudinal groove for the collection and centrifugal discharge of the material collected thereby from said surface.

2. In a device for removing deposited material from a plane surface, a rotatable head, and a cleaning blade carried for rotation with said head and in a plane parallel to said surface, the forward face of said blade being provided with a longitudinal groove, the opposite blade edges defining a plane extending radially of said head and substantially perpendicular to said surface.

3. In a windshield cleaner, a rotatable head, a radially directed cleaning blade carried by said head for rotation in a plane parallel to and opposite a windshield surface and provided at its forward face with a longitudinal groove extending to the outer extremity of the blade, the cleaning edge of said blade being spaced from said surface.

4. In a windshield cleaner, a rotatable head, a radially directed cleaning blade carried by said head for rotation therewith and opposite a windshield surface, means supporting said head for the operative movement of said blade in a plane parallel to and adjacent a windshield surface, and means restraining material removed by said blade to a solely centrifugal discharge from the blade.

5. In cleaner for a windshield and the like carried in a frame, a rotatable head for disposal opposite an intermediate point of the windshield, a radially directed cleaning blade carried by said head for rotation therewith and opposite a windshield surface adjacent said point, a bracket for fixed mounting on said frame and adjustable about a pair of perpendicularly related axes to dispose said head for the operative movement of said blade in a plane parallel to and adjacent said surface, and operating means for said head carried on said bracket.

6. In a rotary cleaner for a planar windshield carried in a frame, a rotatable head for disposal adjacent and opposite an intermediate point of a surface of said windshield and for rotation about an axis perpendicular to said surface, anti-friction means spacing said head from said surface a cleaner blade extending radially from said head and operative to clean said surface, a hollow bracket arm carrying said head in swivelled engagement with one end thereof and supported from said frame at the other end thereof, a flexible drive shaft threading said arm and engaging said head for effecting the rotation thereof, and means to rotate said shaft.

7. A windshield cleaning device comprising a blade mounted adjacent a windshield, means to move said blade in a plane substantially parallel to the surface to be cleaned and anti-friction means contacting the said surface to maintain the blade in spaced relation to said surface.

8. A device of the character described comprising a rotor mounted adjacent a windshield, a blade carried by the rotor parallel to the windshield and bearing means co-operating with the rotor and windshield to maintain a space between the blade and windshield during rotation of the rotor and blade.

9. A device of the character described comprising a rotor mounted adjacent a windshield, a blade carried by the rotor parallel to the windshield, and a ball bearing carried by the rotor and contacting the windshield.

JOSEPH S. MYERS.